United States Patent
Yokoyama et al.

(10) Patent No.: US 10,695,699 B2
(45) Date of Patent: Jun. 30, 2020

(54) FILTER STATE ESTIMATION SYSTEM AND FILTER STATE ESTIMATION METHOD

(71) Applicant: Komatsu Ltd., Minato-ku, Tokyo (JP)

(72) Inventors: Yuuki Yokoyama, Tokyo (JP); Masato Kageyama, Tokyo (JP)

(73) Assignee: Komatsu Ltd., Tokyo (JP)

( * ) Notice: Subject to any disclaimer, the term of this patent is extended or adjusted under 35 U.S.C. 154(b) by 64 days.

(21) Appl. No.: 15/577,942

(22) PCT Filed: Jun. 16, 2017

(86) PCT No.: PCT/JP2017/022363
§ 371 (c)(1),
(2) Date: Nov. 29, 2017

(87) PCT Pub. No.: WO2017/191852
PCT Pub. Date: Nov. 9, 2017

(65) Prior Publication Data
US 2018/0361283 A1   Dec. 20, 2018

(51) Int. Cl.
*B01D 35/143* (2006.01)
*B01D 29/60* (2006.01)
(Continued)

(52) U.S. Cl.
CPC .......... *B01D 35/143* (2013.01); *B01D 29/114* (2013.01); *B01D 29/608* (2013.01);
(Continued)

(58) Field of Classification Search
CPC ................. B01D 35/143; B01D 35/147; B01D 35/1475; B01D 2201/265; B01D 27/013;
(Continued)

(56) References Cited

U.S. PATENT DOCUMENTS 7,174,273 B2 * 2/2007 Goldberg ............. B01D 35/143
702/182

FOREIGN PATENT DOCUMENTS

DE        10357217      7/2005
DE     102007037525    2/2009
(Continued)

OTHER PUBLICATIONS

International Search Report in International Application No. PCT/JP2017/022363, dated Aug. 8, 2017, 8 pages (with English translation).
(Continued)

*Primary Examiner* — Terry K Cecil
(74) *Attorney, Agent, or Firm* — Fish & Richardson P.C.

(57) ABSTRACT

A filter state estimation system is configured to estimate a state of a filter provided in a hydraulic circuit. The hydraulic circuit includes: the filter; a bypass channel circumventing the filter and through which an oil flows; and a valve provided in the bypass channel and configured to be opened and closed based on a differential pressure. The filter state estimation system includes: a sensor to detect that the valve is in an open state or in a closed state; a temperature sensor to detect a temperature of the oil; and a state estimating unit to estimate a state of the filter based on detection results detected by the sensor and the temperature sensor. The state estimating unit estimates the state of the filter based on the temperature of the oil which is detected by the temperature sensor when the sensor detects that the valve is in the open state.

7 Claims, 11 Drawing Sheets

(51) Int. Cl.
  *E02F 9/26* (2006.01)
  *E02F 9/20* (2006.01)
  *B01D 29/11* (2006.01)
  *B01D 35/147* (2006.01)
  *B01D 35/02* (2006.01)
  *E02F 9/22* (2006.01)
  *F15B 21/041* (2019.01)
  *F15B 19/00* (2006.01)
  *E02F 3/32* (2006.01)

(52) U.S. Cl.
  CPC ........... *B01D 35/02* (2013.01); *B01D 35/147* (2013.01); *B01D 35/1475* (2013.01); *E02F 9/2025* (2013.01); *E02F 9/2282* (2013.01); *E02F 9/267* (2013.01); *F15B 21/041* (2013.01); *B01D 2201/265* (2013.01); *E02F 3/32* (2013.01); *F15B 19/005* (2013.01); *F15B 2211/615* (2013.01); *F15B 2211/634* (2013.01); *F15B 2211/6343* (2013.01)

(58) Field of Classification Search
  CPC .... B01D 29/114; B01D 29/608; B01D 35/02; F01M 2001/1092; E02F 3/32; E02F 9/2025; E02F 9/2282; E02F 9/267; F15B 19/005; F15B 21/041; F15B 2211/615; F15B 2211/634; F15B 2211/6343
  See application file for complete search history.

(56) References Cited

FOREIGN PATENT DOCUMENTS

| | | |
|---|---|---|
| DE | 102012017059 | 3/2014 |
| JP | S48095026 | 11/1973 |
| JP | S59010402 | 4/1984 |
| JP | 60-002526 | 1/1985 |
| JP | H06051508 | 7/1994 |
| JP | H07034491 | 2/1995 |
| JP | 2001038114 | 2/2001 |
| JP | 3499303 | 2/2004 |
| JP | 2011085215 | 4/2011 |
| JP | 2013000608 | 1/2013 |

OTHER PUBLICATIONS

Japan Office Action in Japan Application No. 2017-550788, dated Dec. 12, 2017, 5 pages (with English translation).
German Office Action in German Application No. 112017000028.9, dated Dec. 2, 2018, 7 pages.

* cited by examiner

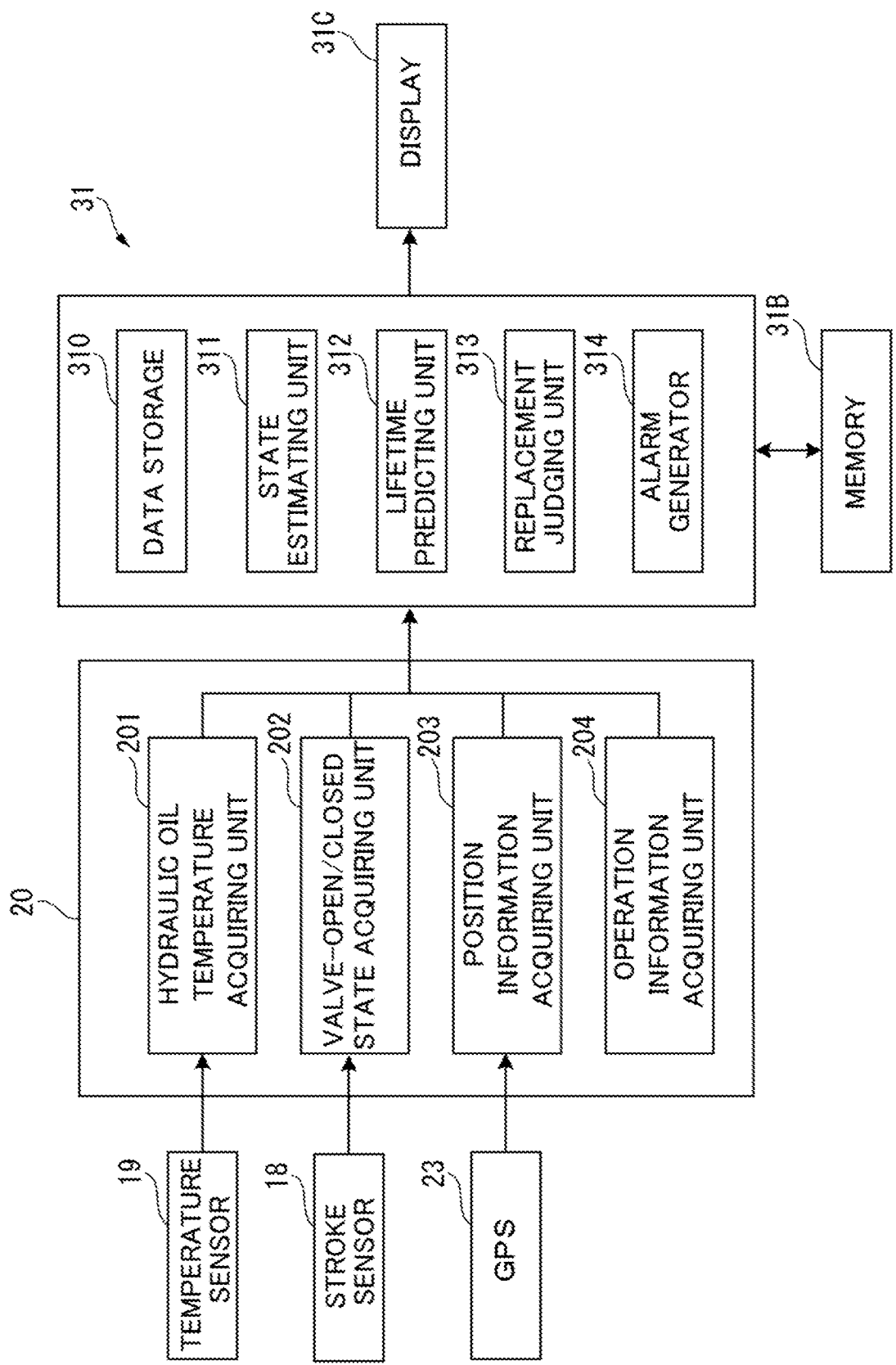

FILTER STATE ESTIMATION SYSTEM AND FILTER STATE ESTIMATION METHOD

CROSS-REFERENCE TO RELATED APPLICATIONS

This application claims priority to International Application No. PCT/JP2017/022363 filed on Jun. 16, 2017, the contents of which are incorporated herein in their entirety.

TECHNICAL FIELD

The present invention relates to a filter state estimation system and a filter state estimation method.

BACKGROUND ART

In a construction machine including a hydraulic actuator such as a hydraulic cylinder (hereinafter, occasionally simply referred to as a cylinder), an oil stored in a hydraulic oil tank is fed to the hydraulic actuator by a hydraulic pump. After the hydraulic actuator is operated, the oil is returned to the hydraulic oil tank. The hydraulic oil tank includes an oil filter. The oil returned from the hydraulic actuator is filtrated with the oil filter and stored in the hydraulic oil tank (see, for instance, Patent Literature 1).

The oil filter includes a filter case and a filter element housed in the filter case. The oil fed through an intake port of the filter case passes through a filtering medium of the filter element to remove foreign substance contained in the oil before the oil is discharged from a discharge port.

Each time foreign substances are removed by the filter element used in the oil filter, the filtering medium becomes clogged with the foreign substances, so that the oil gradually becomes difficult to pass through the filter element. In such a case, there has been known a technique of providing a bypass channel through which an upstream side of the filter element communicates with a downstream side of the filter element, providing a valve in the bypass channel, and, when a differential pressure between the upstream side and the downstream side of the filter element reaches a predetermined value or more, notifying an operator of the clogging of the filter element while opening the valve in the bypass channel to keep the flow of the hydraulic oil (see, for instance, Patent Literature 2 and Patent Literature 3).

CITATION LIST

Patent Literature(s)

Patent Literature 1: JP2013-608A
Patent Literature 2: JP2011-85215A
Patent Literature 3: JP2001-38114A

SUMMARY OF THE INVENTION

Problem(s) to be Solved by the Invention

In the technique of Patent Literature 2 and Patent Literature 3, it can be judged from the valve being in an open state that the filter element becomes clogged, but, it cannot be understood how a state of the filter element has been changed until the filter element is clogged.

An object of the invention is to provide a filter state estimation system and a filter state estimation method of estimating a state of a filter element (hereinafter, also referred to as a filter) when a valve in a bypass channel is in an open state.

Means for Solving the Problem(s)

According to an aspect of the invention, a filter state estimation system is configured to estimate a state of a filter provided in a hydraulic circuit, the hydraulic circuit including: the filter; a bypass channel circumventing the filter and through which an oil flows; and a valve provided in the bypass channel and configured to be opened and closed based on a differential pressure, the system including: a sensor configured to detect that the valve is in an open state or in a closed state; a temperature sensor configured to detect a temperature of the oil; and a state estimating unit configured to estimate a state of the filter based on detection results detected by the sensor and the temperature sensor, in which the state estimating unit is configured to estimate the state of the filter based on the temperature of the oil detected by the temperature sensor when the sensor detects that the valve is in the open state.

In the above aspect of the invention, the temperature sensor detects the temperature of the oil when an open-degree sensor detects that the valve is in an open state. Accordingly, when the valve of the bypass channel is judged to be in the open state, a clogging state of the filter can be estimated according to the temperature of the oil, a lifetime of the filter can be predicted, and the filter can be judged to have been replaced.

BRIEF DESCRIPTION OF DRAWING(S)

FIG. 11 is a functional block diagram showing a controller and a monitor in the above exemplary embodiment.

DESCRIPTION OF EMBODIMENT(S)

[1] Overall Structure

Figure 1:
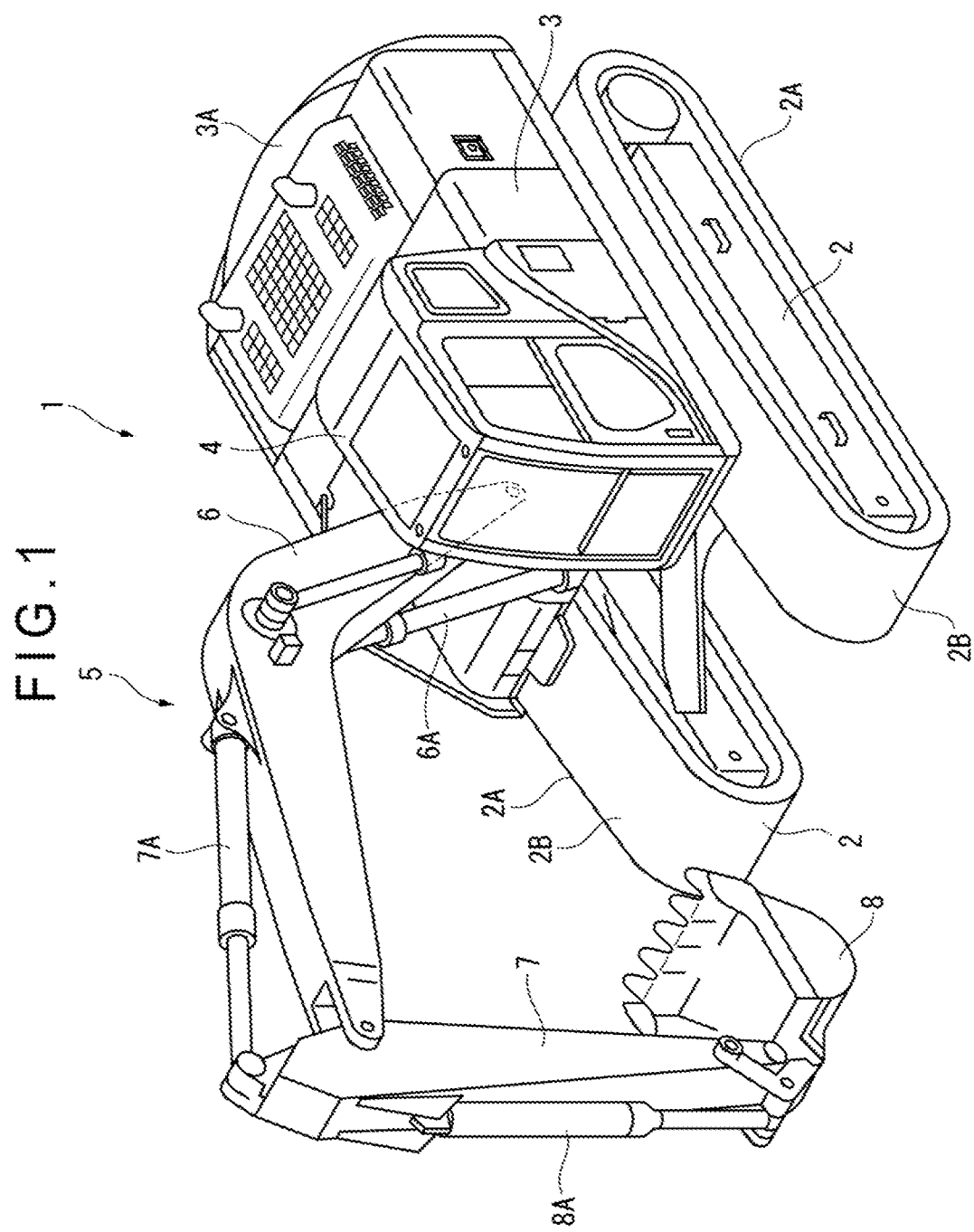
FIG. 1 is a perspective view showing a construction machine according to a first exemplary embodiment of the invention.

FIG. 1 shows a hydraulic excavator 1 according an exemplary embodiment of the invention. The hydraulic excavator 1 as a construction machine includes an undercarriage 2, an upper revolving body 3, and working equipment 5.

The undercarriage 2 includes a truck frame (not shown) and a pair of travel devices 2A provided to both ends of the truck frame in a vehicle width direction orthogonal to a travel direction. Each of the travel devices 2A includes a crawler belt 2B wound around a drive wheel and an idler wheel provided to the truck frame, and is configured to drive the drive wheel to move the hydraulic excavator 1 forward and backward in an extending direction of the crawler belt 2B.

The upper revolving body 3 is rotatably provided on the truck frame of the undercarriage 2 via a swing circle.

A cab 4 is provided on a front-left side of the upper revolving body 3 in the travel direction. The working equipment 5 is provided on a front-center (i.e., next to the cab 4) of the upper revolving body 3. A counterweight 3A is provided on a rear side (i.e., an opposite side from the cab 4 and the working equipment 5) of the upper revolving body 3. The counterweight 3A is provided in order to balance a weight of the hydraulic excavator 1 during a digging operation.

An operator gets in the cab 4 and operates the hydraulic excavator 1. In the cab 4, an operator's seat (not shown in FIG. 1) and control levers on both sides of the operator's seat are provided. A travel pedal is provided on a floor of the cab 4.

The working equipment 5 includes a boom 6, an arm 7, a bucket 8, a boom cylinder 6A for working the boom 6, an arm cylinder 7A for working the arm 7, and a bucket cylinder 8A for working the bucket 8.

A proximal end of the boom 6 is connected to the upper revolving body 3 so that the boom 6 is movable. The boom 6 is vertically moved by extending and contracting the boom cylinder 6A whose ends are respectively connected to the upper revolving body 3 and the boom 6.

A proximal end of the arm 7 is connected to a distal end of the boom 6 so that the arm 7 is movable. The arm 7 is vertically moved by extending and contracting the arm cylinder 7A whose ends are respectively connected to the boom 6 and the arm 7.

A proximal end of the bucket 8 is connected to a distal end of the arm 7 so that the bucket 8 is movable. The bucket 8 is moved by extending and contracting the bucket cylinder 8A whose ends are respectively connected to the arm 7 and the bucket 8.

Figure 2:
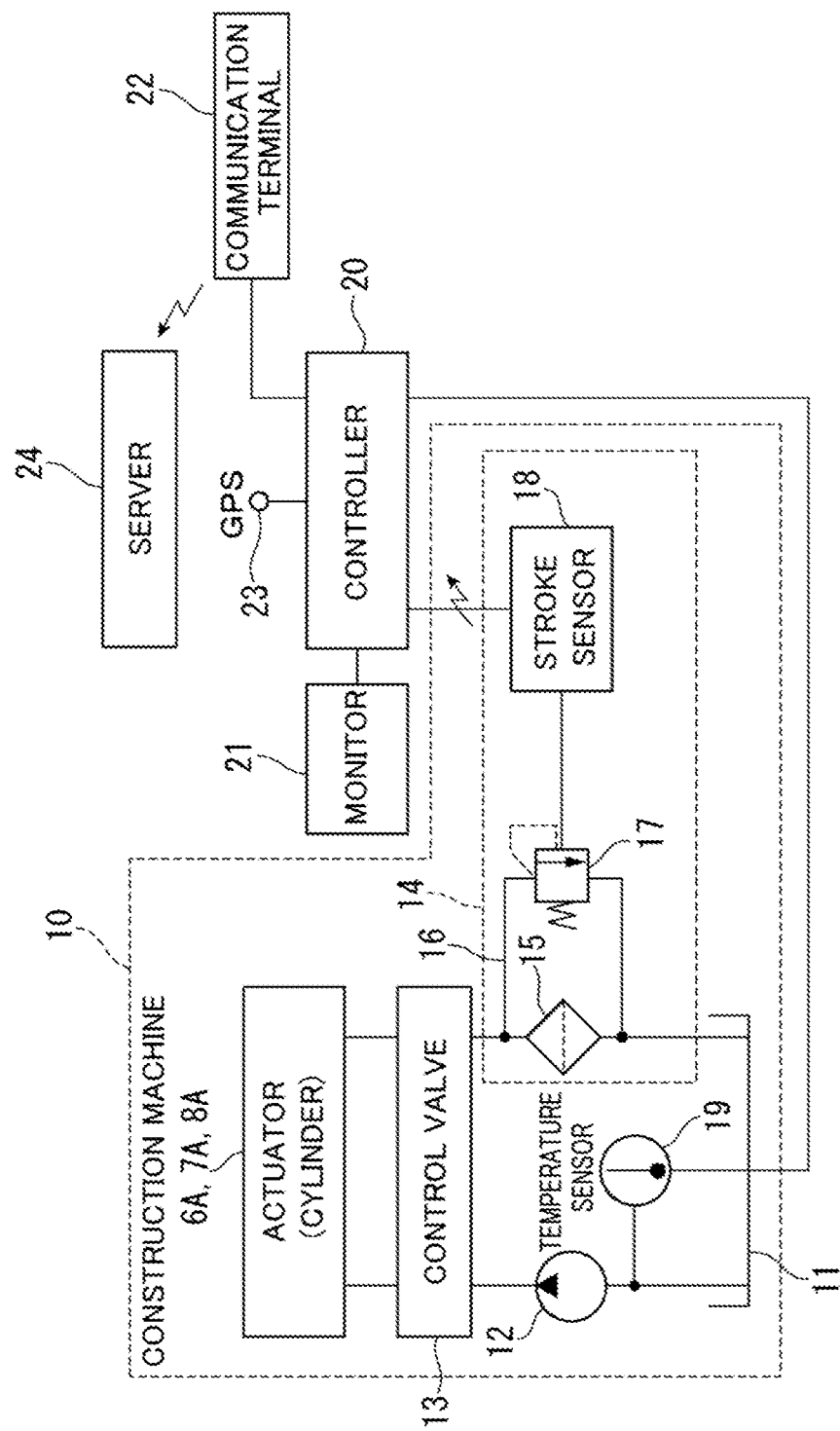
FIG. 2 is a schematic illustration of a hydraulic circuit of the construction machine in the above exemplary embodiment.

The boom cylinder 6A, the arm cylinder 7A, and the bucket cylinder 8A are hydraulic cylinders configured to be driven by a hydraulic oil discharged from a hydraulic pump 12 (see FIG. 2).

[2] Structure of Hydraulic Circuit 10

FIG. 2 shows a hydraulic circuit 10 provided in the hydraulic excavator 1 in the exemplary embodiment. The hydraulic circuit 10 includes a hydraulic oil tank 11, a hydraulic pump 12, a control valve 13, and an oil filter 14.

The hydraulic oil tank 11 is configured to feed a hydraulic oil to the hydraulic pump 12 and store a return hydraulic oil after driving the hydraulic cylinders 6A, 7A and 8A. The hydraulic pump 12 sucks the hydraulic oil from the hydraulic oil tank 11 and pumps the hydraulic oil to the control valve 13.

In response to an operation of a control lever (not shown) in the cab 4, a position of a spool of the control valve 13 is changed to feed the hydraulic oil to the hydraulic cylinders 6A, 7A and 8A (actuators), thereby extending and contracting the hydraulic cylinders 6A, 7A and 8A to work the boom 6, the arm 7, and the bucket 8. It should be noted that the hydraulic oil from the control valve 13 may be fed to a hydraulic motor configured to drive the hydraulic excavator 1. Subsequently, the hydraulic oil discharged from the hydraulic motor is returned to the hydraulic oil tank 11 via the control valve 13.

Moreover, the control valve 13 is also operated in order to return the return hydraulic oil from the hydraulic cylinders 6A, 7A and 8A to the hydraulic oil tank 11 via the oil filter 14.

The oil filter 14 is provided in a return pipe from the control valve 13 and is configured to remove foreign substances mixed in the hydraulic oil flowing through the hydraulic circuit 10. The oil filter 14 includes: a filter element 15; a bypass channel 16 circumventing the filter element 15; and a valve 17 provided in the bypass channel 16.

The valve 17 includes a stroke sensor 18 serving as the open-degree sensor. A detection value by the stroke sensor 18 is outputted to a controller 20.

Moreover, a temperature sensor 19 is provided to an intake port of the hydraulic pump 12. A detection value by the temperature sensor 19 is outputted to the controller 20.

The controller 20 serving as a control device is configured to output a control command to each of components of the hydraulic circuit 10 to control the operation of the hydraulic circuit 10. The controller 20 is connected to a monitor 21 and a communication terminal 22 via Control Area Network (CAN) and configured to intercommunicate with the monitor 21 and the communication terminal 22.

The monitor 21 includes a processor and a display. The display displays various data detected by sensors, such as a temperature of an engine cooling water, fuel residual amount, and temperature of the hydraulic oil.

The communication terminal 22 is configured to output information such as a detection value detected by a sensor and the like, a set value set by the monitor 21, and a position of the hydraulic excavator 1 detected by Global Positioning System (GPS) 23. In the exemplary embodiment, the communication terminal 22 outputs the information to a server 24 through a satellite communication line and a portable communication network.

[3] Detailed Structure of Oil Filter 14

Figure 3:
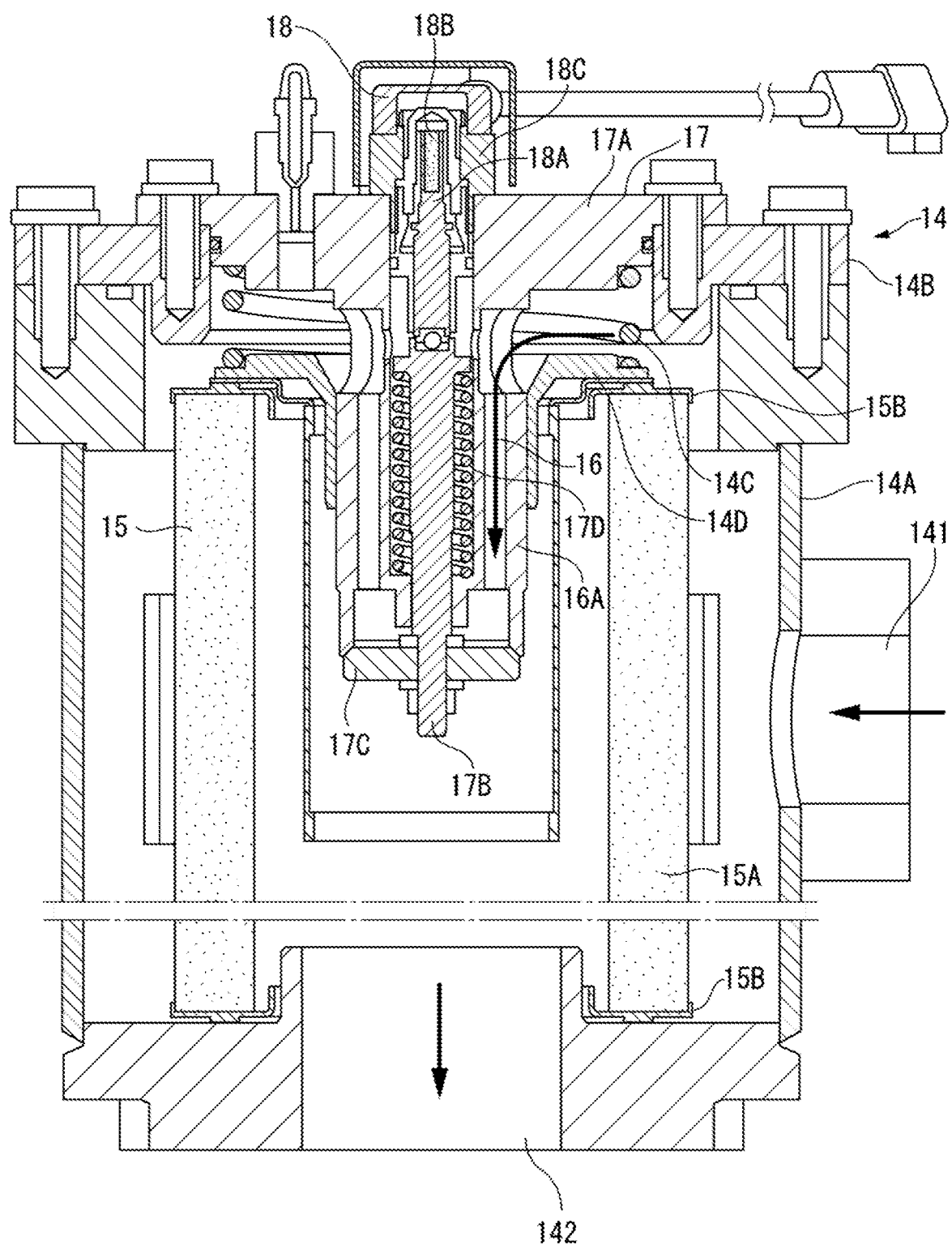
FIG. 3 is a cross-sectional view showing a structure of an oil filter in the above exemplary embodiment.

FIG. 3 shows a detailed structure of the oil filter 14. The oil filter 14 includes a case body 14A and a lid 14B. The case body 14A is a cylindrical container and houses the filter element 15 therein.

A return oil intake port 141 serving as an intake unit is formed on a side surface of the case body 14A. A return pipe extending from the control valve 13 is connected to the return oil intake port 141, whereby the hydraulic oil returned from the control valve 13 is fed into the case body 14A.

A hole 142 serving as a discharge unit is formed at center of the bottom of the case body 14A. The hydraulic oil from which foreign substances are removed by the filter element 15 is fed into the hydraulic oil tank 11.

The lid 14B covers a top surface of the case body 14A. The valve 17 is attached to the center of the lid 14B. The valve 17 has a valve body 17A. A coil spring 14C is provided under the valve body 17A in a manner to be disposed coaxially with a cylinder center axis of the case body 14A.

The coil spring 14C biases the filter element 15 downward via a plate 14D to fix the filter element 15 in the case body 14A.

The filter element 15 includes: a filtering medium 15A formed in a hollow cylinder; and plates 15B respectively provided to ends in a cylinder axis direction of the filtering medium 15A. The filtering medium 15A removes foreign substance contained in the hydraulic oil flowing from an outside to an inside in a radial direction. The plates 15B are respectively in contact with the bottom of the case body 14A and the bottom of the plate 14D. By being biased by the coil spring 14C, the filter element 15 is held coaxially with the axis of the cylinder of the case body 14A. In the following description, the filter element 15 is also referred to as a filter.

The valve 17 includes: a bypass channel 16 through which the hydraulic oil present outside the filter element 15 intercommunicates with the hydraulic oil present inside the filter element 15; and a valve body 17C configured to open and close the bypass channel 16.

Specifically, the valve 17 includes a valve stem 17B, the valve body 17C, and a coil spring 17D. The valve 17 is configured to regulate a flow rate of the hydraulic oil flowing through the bypass channel 16.

The valve stem 17B, which is formed of a steel-made shaft, is housed in the valve body 17A and is vertically slidably supported by the valve body 17A.

The valve body 17C is a disc-shaped lid attached to a lower end of the valve stem 17B. When the valve stem 17B is moved upward, the valve body 17C closes the bypass channel 16 to block the flow of the hydraulic oil. When the valve stem 17B is moved downward, a gap is formed between the bypass channel 16 and the valve body 17C and the hydraulic oil flows through the gap. The coil spring 17D, in which the valve stem 17B is inserted, biases the valve stem 17B upward.

The stroke sensor 18 is provided to a top proximal end of the valve stem 17B. The stroke sensor 18 includes: a movable portion 18A including a magnet 18B; and a sensor body 18C.

The movable portion 18A is connected to the proximal end of the valve stem 17B and is configured to vertically slide in conjunction with the sliding of the valve stem 17B.

The magnet 18B is provided to an upper end of the movable portion 18A and is configured to vertically move in conjunction with the vertical sliding of the movable portion 18A.

The sensor body 18C has a magnetically sensitive element (e.g., Hall IC) therein and is configured to detect a change in a magnetic field caused by the vertical movement of the magnet 18B.

In the above oil filter 14, typically, after the hydraulic oil is sucked from the return oil intake port 141, the hydraulic oil passes through the filtering medium 15A of the filter element 15 to remove foreign substance, and subsequently the hydraulic oil is returned to the hydraulic oil tank 11 through the hole 142 on the bottom of the oil filter 14.

However, when the filtering medium 15A of the filter element 15 becomes clogged by capturing foreign substance, the hydraulic oil becomes difficult to pass through the filtering medium 15A, so that the sucked hydraulic oil is fed to the bypass channel 16 to increase a pressure of the hydraulic oil in the bypass channel 16.

When a differential pressure between a pressure of the hydraulic oil in the bypass channel 16 on an upstream side of the valve body 17C and a pressure of the hydraulic oil in the bypass channel 16 on a downstream side of the valve body 17C is large, the valve stem 17B biased upward by the coil spring 17D slides downward. In conjunction with this sliding, the valve body 17C is moved downward, so that the hydraulic oil flowing through the bypass channel 16 is discharged from the hole 142.

Simultaneously with the downward sliding of the valve stem 17B, the movable portion 18A of the stroke sensor 18 also slides downward. The sensor body 18C of the stroke sensor 18 detects the sliding of the movable portion 18A and outputs this detection in a form of an electric signal, thereby notifying the controller 20 of information that the valve 17 is in an open state.

[4] Functional Block Structure of Controller 20 and Server 24

Figure 4:
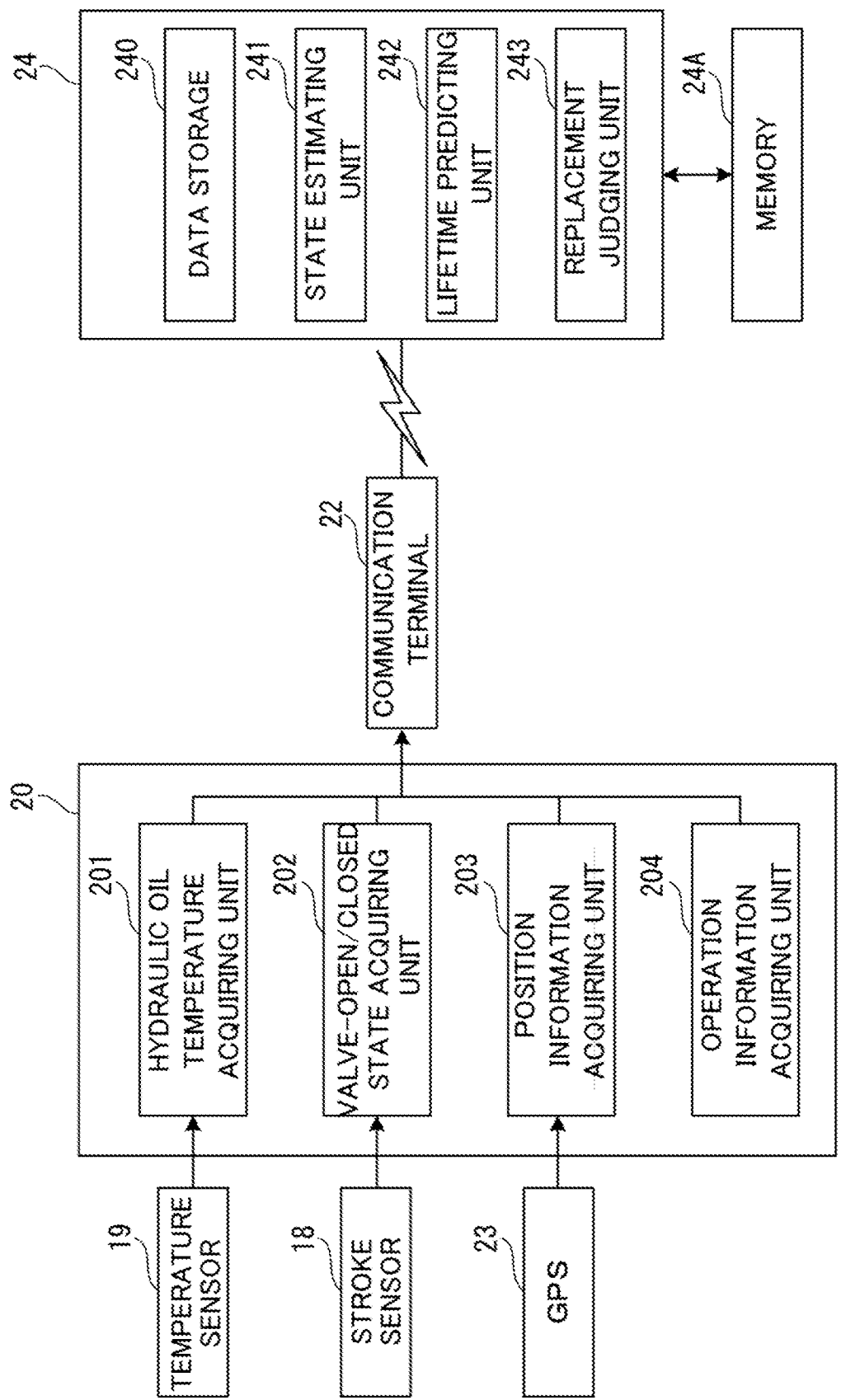
FIG. 4 is a functional block diagram showing a controller and a server in the above exemplary embodiment.

FIG. 4 is a functional block diagram showing the controller 20 and the server 24.

The controller 20 is configured to acquire detection data by various sensors provided in the hydraulic excavator 1. The controller 20 includes a hydraulic oil temperature acquiring unit 201, a valve-open/closed state acquiring unit 202, a position information acquiring unit 203, and an operation information acquiring unit 204.

The hydraulic oil temperature acquiring unit 201 is configured to acquire temperature detection data by the temperature sensor 19 provided in the hydraulic oil tank 11.

The valve-open/closed state acquiring unit 202 is configured to acquire detection data on open and closed states of the valve 17 detected by the stroke sensor 18 to detect the open and closed states of the valve 17. Specifically, the valve-open/closed state acquiring unit 202 acquires the open and closed states of the valve 17 based on whether or not a time when a stroke amount detected by the stroke sensor 18 exceeds a predetermined threshold lasts for a predetermined time.

The position information acquiring unit 203 acquires a current position of the hydraulic excavator 1 detected by the GPS23.

The operation information acquiring unit 204 acquires the detection data from various sensors provided in the hydraulic excavator 1 to acquire operation information of the hydraulic excavator 1. Examples of the operation information include a temperature of an engine cooling water, a fuel residual amount, and an operation time and an operation fuel efficiency of the hydraulic excavator 1.

The controller 20 outputs the acquired information including the hydraulic oil temperature, the open and closed states of the valve 17 and the operation information of the hydraulic excavator 1 to the communication terminal 22.

The server 24 receives various information outputted from the communication terminal 22 and stores the information therein. The server 24 includes a memory 24A, a data storage 240, a state estimating unit 241, a lifetime predicting unit 242, and a replacement judging unit 243.

The memory 24A is configured to store various table data described later.

Figure 5:
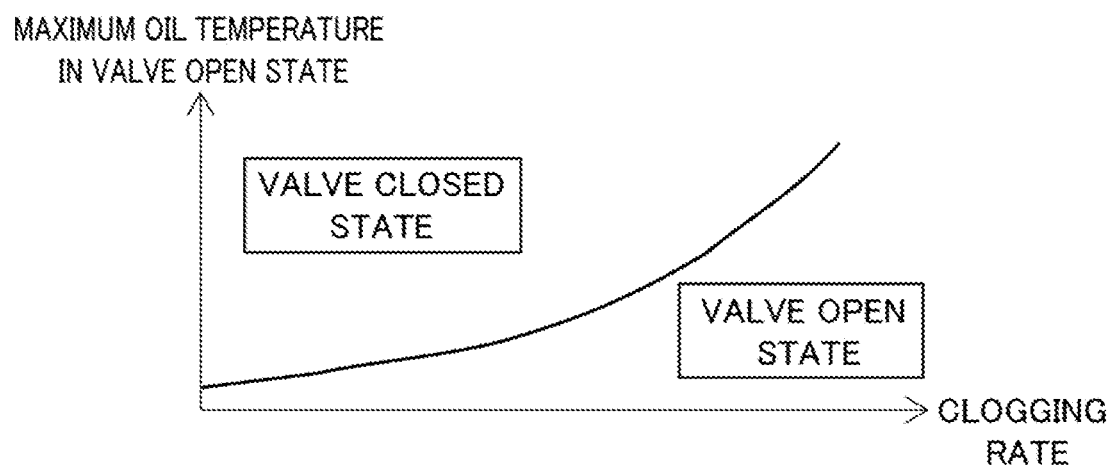
FIG. 5 is a schematic illustration of a state estimation table in the above exemplary embodiment.

The state estimating unit 241 is configured to estimate a clogging state of the filter element 15 based on the maximum oil temperature in the open state of the valve 17. Specifically, as shown in FIG. 5, the state estimating unit 241 estimates a clogging rate of the filter element 15 based on the maximum oil temperature in the open state of the valve 17, in view of a state estimation table showing a relationship between the maximum oil temperature in the valve open state and the clogging rate of the filter element 15. Herein, the maximum oil temperature in the open state of the valve 17 means the maximum temperature of the hydraulic oil obtained by constantly detecting a hydraulic oil temperature in the open state of the valve 17 and acquiring the maximum temperature during a predetermined elapsed time (e.g., 10 hours). Since a viscosity of the oil is low at a high temperature, a differential pressure is generally unlikely to be caused at a high temperature. However, when the clogging of the filter element 15 progresses, the differential pressure becomes large even at the high temperature.

Figure 6:
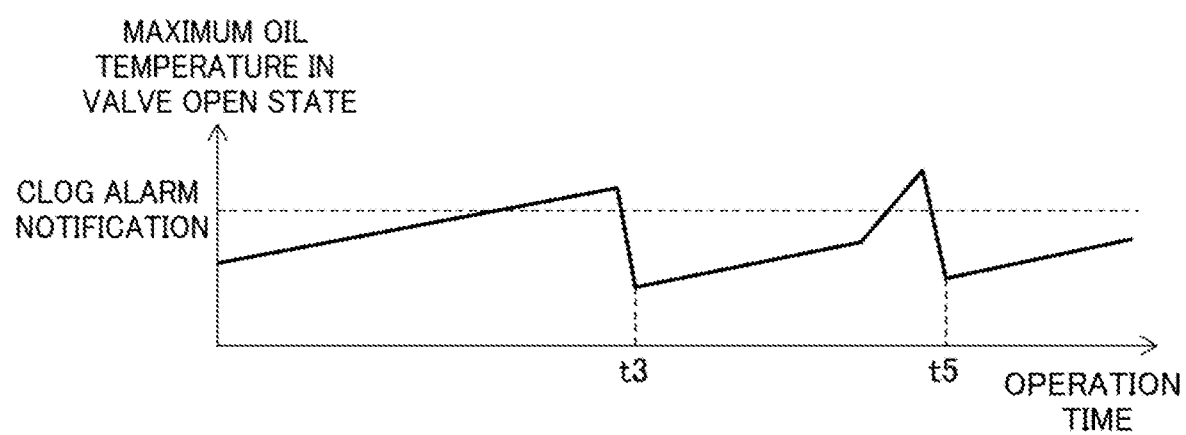
FIG. 6 is a schematic illustration of time-series maximum oil temperature data in the above exemplary embodiment.

The data storage 240 is configured to store the maximum oil temperature data in the open state of the valve 17 in time-series as shown in FIG. 6, and output the results to the lifetime predicting unit 242 and the replacement judging unit 243.

The lifetime predicting unit 242 is configured to predict a lifetime of the filter element 15 based on a transition of a state of the filter element 15 in the open state of the valve 17 with reference to the monitor result of the maximum oil temperature of the state estimating unit 241.

The lifetime of the filter is estimated by obtaining a time when the maximum oil temperature in the open state of the valve 17 reaches a temperature of a clogging alarm level (e.g., 40 degrees C.) based on a time-series change between the maximum oil temperature in the open state of the valve 17 at a current time and the maximum oil temperature in the open state of the valve 17 close to the current time.

Figure 7A:
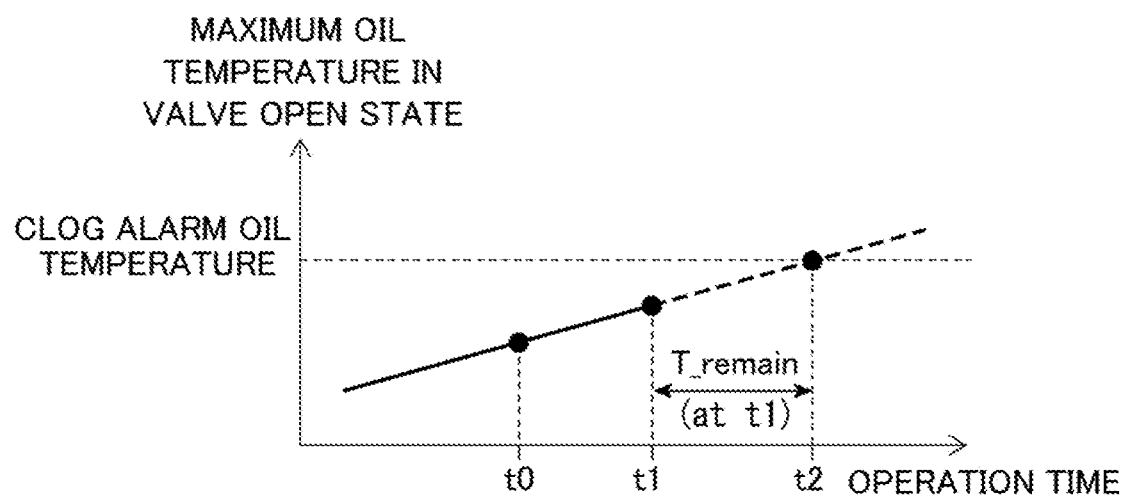
FIG. 7A is a schematic illustration for explaining a lifetime prediction in the above exemplary embodiment.

For instance, the lifetime of the filter element 15 as of a time t1 in FIG. 7A is defined by a time T_remain representing a time from the time t1 to a time t2. The time T_remain is estimated by calculating (e.g., extrapolating) the time t2 when the maximum oil temperature reaches the clogging alarm level based on a change in the maximum oil temperature between the time t1 and a time t0 close to the time t1.

Figure 7B:
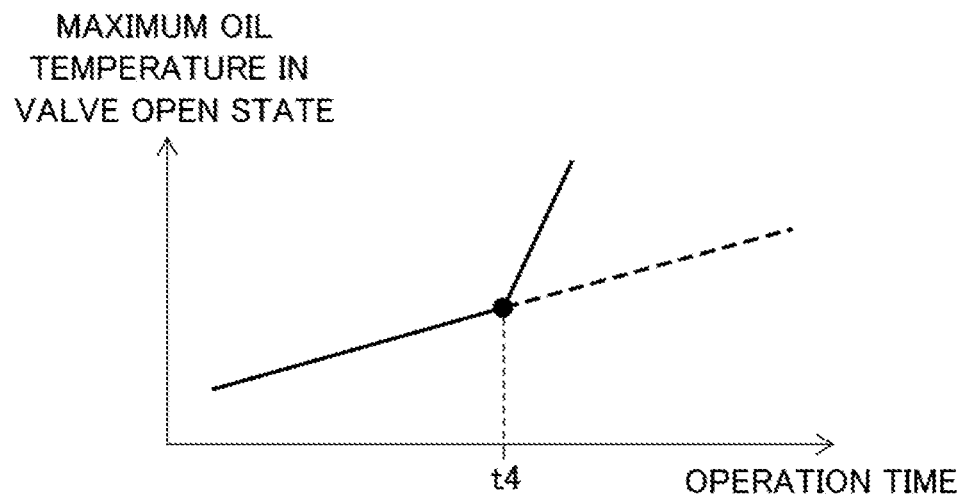
FIG. 7B is a schematic illustration for explaining a case where abnormality occurs in the oil filter in the above exemplary embodiment.

Moreover, as shown in FIG. 7B, when the maximum oil temperature in the open state of the valve 17 is sharply changed as shown at a time t4, the lifetime predicting unit 242 judges that abnormality has occurred in the filter element 15.

The replacement judging unit 243 is configured to judge whether the filter element 15 has been replaced or not based on the maximum oil temperature time-series data in the valve open state outputted by the data storage 240. Specifically, when the maximum oil temperature in the open state of the valve 17 is sharply declined to a predetermined value or less, the replacement judging unit 243 judges that the filter element 15 has been replaced.

For instance, in FIG. 6, a time t3 and a time t5 are judged as a replacement time of the filter element 15. After an elapse of a predetermined operation time (e.g., 1000 hours) after the replacement of the filter element 15, a message of encouraging the replacement of the filter element 15 is displayed on the monitor 21 and the like. Moreover, a replacement time is also displayed as a history on the monitor 21 and the like.

[5] Judging Method of Open State of Valve 17 in Controller 20

Figure 8:
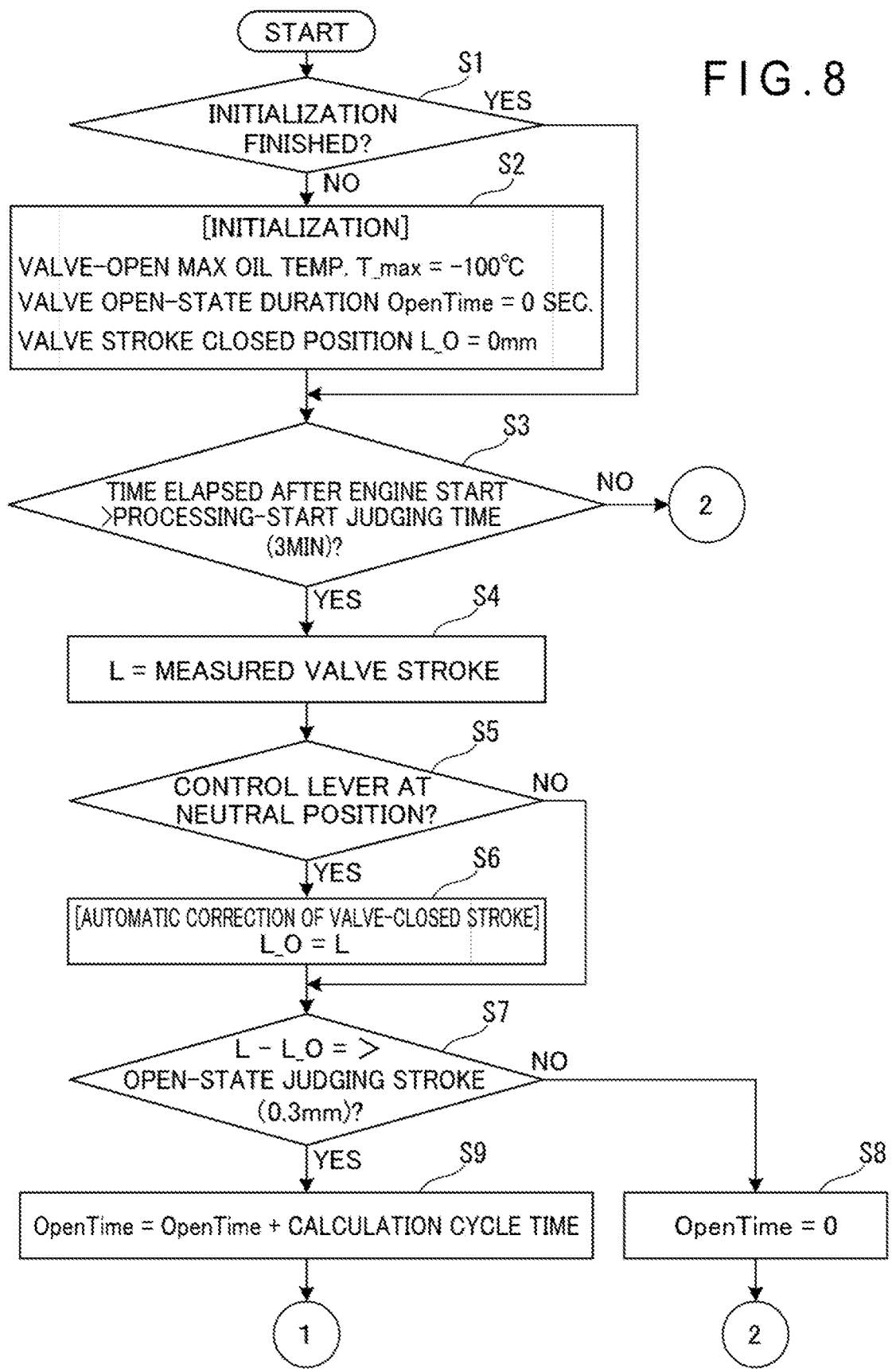
FIG. 8 is a flow chart showing an estimation method of a filter state in the above exemplary embodiment.
Figure 9:
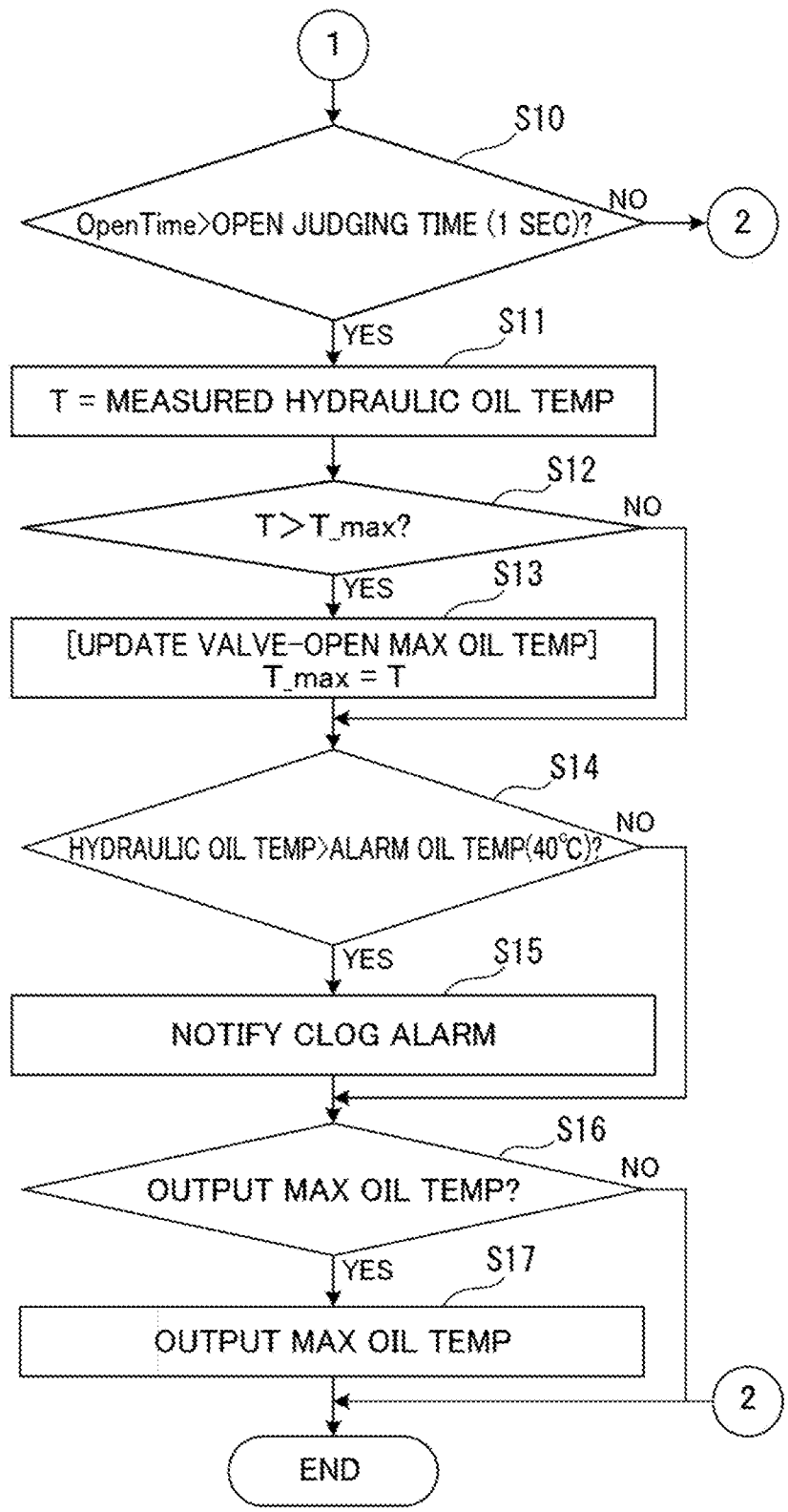
FIG. 9 is another flow chart showing the estimation method of the filter state in the above exemplary embodiment.

Next, a judging method of the open state of the valve 17 in the above controller 20 will be described based on the flowcharts shown in FIGS. 8 and 9. The controller 20 repeatedly executes a series of processings shown in the flowcharts in a predetermined cycle (e.g., a 0.01 second cycle). It should be noted that, even when an operation state and an operation load of the working equipment 5 in the hydraulic excavator 1 are changed, an amount of the hydraulic oil flowing into the filter element 15 is averaged within a predetermined time and a fluctuation in the amount of the hydraulic oil caused by the operation of the working equipment 5 can be ignored.

Although the measurement of the maximum oil temperature is triggered by the start of the engine in the exemplary embodiment, the measurement of the maximum oil temperature may be triggered by a judgment of the valve 17 being in the open state due to another reason.

The controller 20 judges whether the maximum oil temperature in the open state of the valve 17, a duration when the valve 17 is in the open state, and a position of the valve 17 in a closed state are initialized or not (Step S1).

When the initialization is completed (S1: Yes), the procedure proceeds to Step S3.

When the initialization is not completed (S1: No), the hydraulic oil temperature acquiring unit 201 initializes the maximum oil temperature T_max in the open state of the valve 17 to, for instance, −100 degrees C. The valve-open/closed state acquiring unit 202 initializes an open-state duration OpenTime of the valve to zero seconds and initializes a valve-stroke closed position L_0 to 0 mm (Step S2).

The controller 20 judges whether or not the time elapsed after the start of the engine exceeds a processing-start judging time (e.g., three minutes) (Step S3).

When the time elapsed after the start of the engine does not exceed the processing-start judging time (S3: No), the processing is finished.

When the time elapsed after the start of the engine exceeds the processing-start judging time (S3: Yes), the valve-open/closed state acquiring unit 202 measures a stroke L of the valve 17 by the stroke sensor 18 (Step S4).

The valve-open/closed state acquiring unit 202 judges whether or not the control lever is at a neutral position (Step S5).

When the control lever is not at a neutral position (S5: No), the procedure proceeds to Step S7.

When the control lever is at a neutral position (S5: Yes), the valve-open/closed state acquiring unit 202 automatically corrects the valve-stroke closed position L_0 to the stroke L measured at the current time by the stroke sensor 18 (Step S6).

The valve-open/closed state acquiring unit 202 judges whether or not a difference between the stroke L measured by the stroke sensor 18 and the valve-stroke closed position L_0 is larger than a stroke (e.g., 0.3 mm) for judging whether the valve 17 is opened (hereinafter, also referred to as an open-state judging stroke) (Step S7).

When judging that the difference is smaller than the open-state judging stroke (S7: No), the valve-open/closed state acquiring unit 202 resets the open-state duration OpenTime of the valve 17 to zero (Step S8) to finish the processing.

When judging that the difference is larger than the open-state judging stroke (S7: Yes), the valve-open/closed state acquiring unit 202 adds a calculation cycle (e.g., 0.01 seconds) to the open-state duration OpenTime of the valve 17 to update the open-state duration OpenTime of the valve 17 (Step S9).

The valve-open/closed state acquiring unit 202 judges whether or not the open-state duration OpenTime of the valve 17 exceeds a time (e.g., 1 second) for judging a valve open state (Step S10).

When the open-state duration OpenTime of the valve 17 does not exceed the time for judging the open state (S10: No), the processing is finished.

When the open-state duration OpenTime of the valve 17 exceeds the time for judging the open state (S10: Yes), the hydraulic oil temperature acquiring unit 201 measures a hydraulic oil temperature T using the temperature sensor 19 (Step S11).

The hydraulic oil temperature acquiring unit 201 judges whether or not the acquired hydraulic oil temperature T exceeds the maximum oil temperature T_max (Step S12).

When the measured hydraulic oil temperature T is equal to or less than the maximum oil temperature T_max (S12: No), the procedure proceeds to S14.

When the measured hydraulic oil temperature T exceeds the maximum oil temperature T_max (S12: Yes), the hydraulic oil temperature acquiring unit 201 updates the maximum oil temperature T_max to the measured hydraulic oil temperature T (Step S13).

The hydraulic oil temperature acquiring unit 201 judges whether the measured hydraulic oil temperature T exceeds an alarm oil temperature (e.g., 40 degrees C.) (Step S14).

When the measured hydraulic oil temperature T is equal to or less than the alarm oil temperature, the procedure proceeds to Step S16.

When the measured hydraulic oil temperature T exceeds the alarm oil temperature, the hydraulic oil temperature acquiring unit 201 outputs the information to the monitor 21 and the monitor 21 displays a clogging alarm showing the filter element 15 being in a clogged state (Step S15).

The communication terminal 22 judges whether to output the maximum oil temperature T_max and the open-state duration OpenTime of the valve 17 which are acquired by the controller 20 to the server 24, together with the position information acquired by the position information acquiring unit 203 and the operation information acquired by the operation information acquiring unit 204 (Step S16).

When the communication terminal 22 judges that it is not time to output the information (Step S16: No), the processing is finished.

When judging that it is time to output the information, the communication terminal 22 outputs the maximum oil temperature T_max and the open-state duration OpenTime of the valve 17 to the server 24 (Step S17). The timing for outputting the information can be set as needed, for instance, every 20 hours of the operation time. When the filter element 15 is suddenly clogged as shown at a time t4 in FIG. 7B, the communication terminal 22 may output the above information at the time t4.

In the server 24, the state estimating unit 241 estimates the clogging state of the filter element 15 based on the maximum oil temperature T_max and the open-state duration OpenTime of the valve 17 outputted from the communication terminal 22, and the data storage 240 stores the maximum oil temperature T_max and the open-state duration OpenTime in time-series. The lifetime predicting unit 242 predicts the lifetime of the filter element 15 based on the time-series change in the maximum oil temperature in the open state of the valve 17. Further, when the maximum oil temperature in the open state of the valve 17 is sharply declined to a predetermined value or less, the replacement judging unit 243 judges that the filter element 15 has been replaced.

According to the exemplary embodiment, the following advantages are obtainable.

Since the controller 20 includes the valve-open/closed state acquiring unit 202 and the hydraulic oil temperature acquiring unit 201, the temperature sensor 19 can detect the hydraulic oil temperature when the stroke sensor 18 detects that the valve 17 in the bypass channel 16 is in the open state. Accordingly, when the server 24 analyzes the transition of the maximum oil temperature in the open state of the valve 17, the server 24 can estimate the clogging state of the filter element 15, predict the lifetime of the filter element 15, and judge whether the filter element 15 has been replaced or not.

[6] Second Exemplary Embodiment

Next, a second exemplary embodiment of the invention will be described. It should be noted that the members and the like that are the same as ones described above will be provided with the same numerals and description thereof will be omitted.

In the first exemplary embodiment, the detection result of the open or closed state of the valve 17 which is detected by the sensor and the like and the detection result of the temperature by the temperature sensor 19 are outputted via the communication terminal 22 to the server 24.

Figure 10:
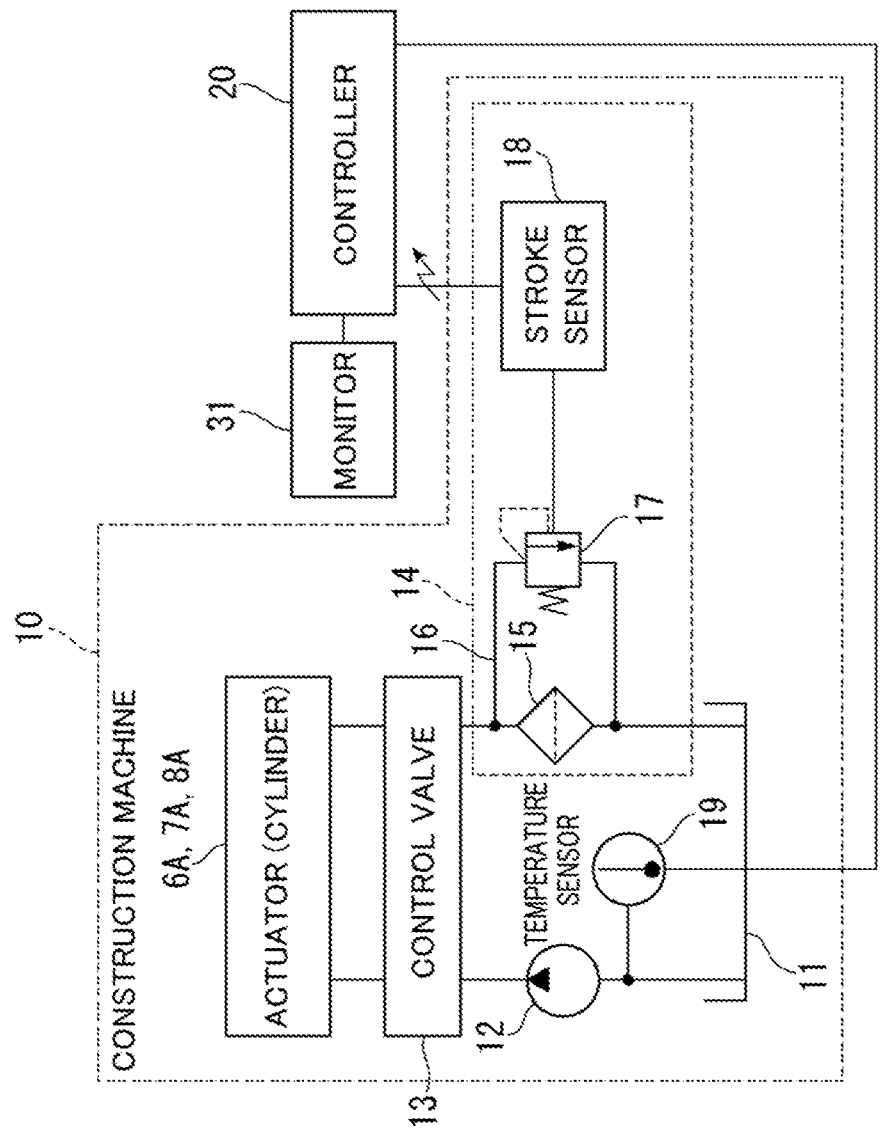
FIG. 10 is a schematic illustration showing a hydraulic circuit in a construction machine according to a second exemplary embodiment of the invention.

In contrast, as shown in FIGS. 10 and 11, the second exemplary embodiment is different from the first exemplary embodiment in that a monitor 31 processes the detection result of the open or closed state of the valve 17 and the detection result of the temperature by the temperature sensor 19.

The monitor 31 displays various data detected by sensors, such as a temperature of the engine cooling water, fuel residual amount, and temperature of the hydraulic oil. The monitor 31 includes a processor 31A, a memory 31B, and a display 31C.

The processor 31A includes a data storage 310, a state estimating unit 311, a lifetime predicting unit 312, a replacement judging unit 313, and an alarm generator 314, which have the same functions as those in the first exemplary embodiment. Moreover, a state estimation table is stored in the memory 31B in the same manner as in the first exemplary embodiment.

The state estimating unit 311 estimates the clogging state of the filter element 15 based on the temperature detection result detected by the temperature sensor 19 in view of the table stored in the memory 31B.

Moreover, the state estimating unit 311 generates image information indicating how far (e.g., to a high, intermediate, or low degree) the clogging state of the filter element 15 progresses, and displays the image information on the display 31C. The image information to be displayed is not limited to the above, but may be an image indicating the clogging degree in percentage terms.

The data storage 310 is configured to store the maximum oil temperature data of the valve 17 in time-series and outputs the results to the lifetime predicting unit 312 and the replacement judging unit 313, in the same manner as in the first exemplary embodiment.

The lifetime predicting unit 312 is configured to predict a lifetime of the filter element 15 based on the maximum oil temperature in the open state of the valve 17 with reference to the monitor result of the maximum oil temperature of the state estimating unit 311. A predicting method is the same as in the first exemplary embodiment.

The replacement judging unit 313 is configured to judge that the filter element 15 has been replaced based on the state estimation of the filter element 15 by the state estimating unit 311.

The alarm generator 314 displays a clogging alarm on the display 31C when the hydraulic oil temperature detected by the temperature sensor 19 exceeds the alarm oil temperature. It should be noted that the clogging state is not only displayed on the display 31C, but may be informed using an alarming sound.

Even according to the second exemplary embodiment, the same functions and effects as those in the first exemplary embodiment are obtainable.

Moreover, according to the second exemplary embodiment, since the monitor 31 of the hydraulic excavator 1 estimates the state of the filter element 15, the clogging of the filter element 15 can be managed in a stand-alone manner, thereby avoiding complication of the system.

[7] Modification of Embodiments

It should be understood that the scope of the invention is not limited to the above-described exemplary embodiments but includes modifications and improvements as long as the modifications and improvements are compatible with the invention.

In the above exemplary embodiments, the filter state estimation system is applied to the hydraulic excavator 1. However, application of the system is not limited thereto. The filter state estimation system may be applied to other construction machines such as a wheel loader and a bulldozer.

In the above exemplary embodiments, the temperature sensor 19 is provided near the intake port of the hydraulic pump 12. However, the location of the temperature sensor 19 is not limited thereto. The temperature sensor may be provided inside the hydraulic oil tank 11 or may be provided near the hole 142 under the filter element 15.

In the above exemplary embodiments, the stroke sensor 18 is used for detecting the opening and closing of the valve 17. However, the detector is not limited to the stroke sensor, but may be an optical sensor such as an encoder.

Further, the specific arrangements and configurations may be altered in any manner as long as the modifications and improvements are compatible with the invention.

1 . . . hydraulic excavator, 2 . . . undercarriage, 2A . . . travel devices, 2B . . . crawler belt, 3 . . . upper revolving body, 3A . . . counterweight, 4 . . . cab, 5 . . . working equipment, 6 . . . boom, 6A . . . boom cylinder, 7 . . . arm, 7A . . . arm cylinder, 8 . . . bucket, 8A . . . bucket cylinder, 10 . . . hydraulic circuit, 11 . . . hydraulic oil tank, 12 . . . hydraulic pump, 13 . . . control valve, 14 . . . oil filter, 14A . . . case body, 14B . . . lid, 14C . . . coil spring, 14D . . . plate, 15 . . . filter element, 15A . . . filtering medium, 15B . . . plate, 16 . . . bypass channel, 17 . . . valve, 17A . . . valve body, 17B . . . valve stem, 17C . . . valve body, 17D . . . coil spring, 18 . . . stroke sensor, 18A . . . movable portion, 18B . . . magnet, 18C . . . sensor body, 19 . . . temperature sensor, 20 . . . controller, 21 . . . monitor, 22 . . . communication terminal, 23 . . . GPS, 24 . . . server, 24A . . . memory, 31 . . . monitor, 31A . . . processor, 31B . . . memory, 31C . . . display, 141 . . . return oil intake port, 142 . . . hole, 201 . . . hydraulic oil temperature acquiring unit, 202 . . . valve-open/closed state acquiring unit, 203 . . . position information acquiring unit, 204 . . . operation information acquiring unit, 240 . . . data storage, 241 . . . state estimating unit, 242 . . . lifetime predicting unit, 243 . . . replacement judging unit, 310 . . . data storage, 311 . . . state estimating unit, 312 . . . lifetime predicting unit, 313 . . . replacement judging unit, 314 . . . alarm generator.

The invention claimed is:

1. A filter state estimation system configured to estimate a state of a filter provided in a hydraulic circuit, the hydraulic circuit comprising: the filter; a bypass channel circumventing the filter and through which an oil flows; and a valve provided in the bypass channel and configured to be opened and closed based on a differential pressure, the system comprising:
a sensor configured to detect, after a predetermined elapsed time from a start of an engine, whether the valve is in an open state or in a closed state;
a temperature sensor configured to detect a temperature of the oil; and
a state estimating unit configured to estimate a clogging degree of the filter in accordance with detection results detected by the sensor and the temperature sensor, wherein the clogging degree comprises a high degree, an intermediate degree, and a low degree, and
wherein the state estimating unit is configured to estimate the clogging degree of the filter based on the temperature of the oil detected by the temperature sensor when the sensor detects that the valve is in the open state, and to generate image information unique to the estimated clogging degree.

2. The filter state estimation system according to claim 1, wherein
the state estimating unit is configured to monitor the temperature of the oil in the open state of the valve for a predetermined time, and
the filter state estimation system further comprises a lifetime predicting unit configured to predict a remaining lifetime of the filter based on a transition of the clogging degree of the filter estimated by the state estimating unit.

3. The filter state estimation system according to claim 1, wherein
the state estimating unit is configured to monitor the temperature of the oil in the open state of the valve for a predetermined time, and
the filter state estimation system further comprises a replacement judging unit configured to judge that the filter has been replaced based on a transition of the clogging degree of the filter estimated by the state estimating unit.

4. The filter state estimation system according to claim 1, wherein the state estimating unit is configured to estimate the clogging degree of the filter based on a maximum value of the temperature of the oil.

5. The filter state estimation system according to claim 4, wherein the clogging degree of the filter increases based on an increase of the maximum value of the temperature of the oil.

6. The filter state estimation system according to claim 1, further comprising:
a non-transitory memory configured to store a state estimation table that includes information on a relationship between the clogging degree and the temperature of the oil,
wherein the state estimating unit is configured to identify, from the state estimation table, the clogging degree corresponding to the temperature of the oil.

7. A filter state estimation method of estimating a state of a filter provided in a hydraulic circuit, the hydraulic circuit comprising: the filter; a bypass channel circumventing the filter and through which an oil flows; and a valve provided in the bypass channel and configured to be opened and closed based on a differential pressure, the method comprising:
detecting, after a predetermined elapsed time from a start of an engine, whether the valve is in an open state;
estimating a clogging degree of the filter in accordance with a temperature of the oil obtained when detecting that the valve is in the open state, wherein the clogging degree comprises a high degree, an intermediate degree, and a low degree; and generating image information unique to the estimated clogging degree.

\* \* \* \* \*